June 23, 1931. G. B. WATKINS 1,810,934
APPARATUS FOR USE IN THE MANUFACTURE OF LAMINATED GLASS
Filed Dec. 7, 1928
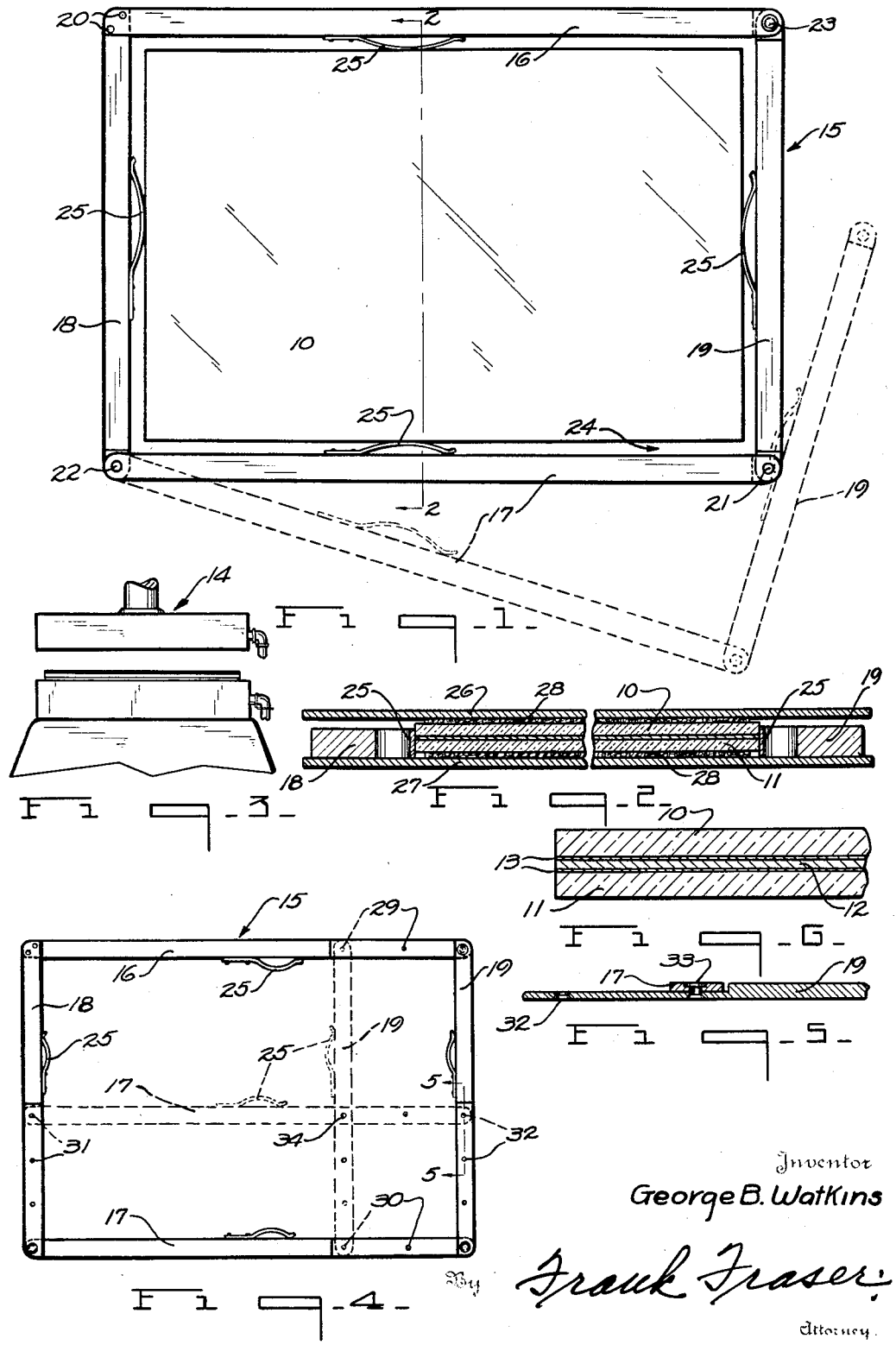

Patented June 23, 1931

1,810,934

UNITED STATES PATENT OFFICE

GEORGE B. WATKINS, OF TOLEDO, OHIO, ASSIGNOR TO LIBBEY-OWENS-FORD GLASS COMPANY, OF TOLEDO, OHIO, A CORPORATION OF OHIO

APPARATUS FOR USE IN THE MANUFACTURE OF LAMINATED GLASS

Application filed December 7, 1928. Serial No. 324,456.

The present invention relates broadly to the manufacture of laminated or composite glass and has for its principal object the provision of improved means for maintaining the several laminations or sheets to be joined in properly superposed or assembled relation and for preventing relative movement or slippage therebetween during the uniting thereof to form a composite sheet.

Another object of the invention resides in the provision of means whereby the sheets of variously sized sets of sheets may be effectively held against relative movement during the uniting thereof.

A further object resides in the provision of means for the purposes above described including a frame for receiving the assembled sheets of material to be joined therein and for holding the same against slippage relative to one another, said frame being preferably adjustable so that the size of the frame opening may be varied to provide for sets of sheets of various sizes.

Other objects and advantages of the invention will become more apparent during the course of the following description when taken in connection with the accompanying drawings.

In the drawings forming a part of this application and wherein like numerals are employed to designate like parts throughout the same, Fig. 1 is a plan view of apparatus provided by the present invention.

Fig. 2 is a section taken substantially on line 2—2 of Fig. 1.

Fig. 3 is a diagrammatic representation of one type of press which may be used for uniting the assembled sheets or laminations.

Fig. 4 is a view similar to Fig. 1 but showing a modified or adjustable frame.

Fig. 5 is a section taken substantially on line 5—5 of Fig. 4, and

Fig. 6 is a sectional view of a finished sheet of laminated glass.

Laminated or composite glass generally consists of two or more sheets of glass and an intervening sheet or sheets of a cellulose composition or other non-brittle material all securely bonded together to form a composite or laminated sheet. When properly formed, such a sheet is non-shatterable or non-scatterable. That is, upon a fracture of the glass sheets, the glass will adhere to the non-brittle sheet and will not fly or scatter about. There are numerous ways in which laminated glass can be fashioned but in practically all cases some form of liquid or bonding medium is used, this medium being applied to the faces of the glass sheets to be united to the intervening sheet or sheets of non-brittle material whereby a union of the laminæ will be effected when subjected to the action of heat and pressure. Due to the liquid characteristics of the bonding medium, there is a tendency for the assembled laminations to move or slip relative to one another during the uniting thereof.

It is quite important that such relative movement or slippage be prevented as ordinarily the glass sheets and the sheet or sheets of non-brittle material are cut to the proper size before the laminated sheet is produced because of the difficulties encountered in cutting laminated glass after it has been made. The aim of the present invention is to provide improved means for maintaining the assembled laminations against relative movement during the uniting thereof whereby to facilitate the production of the glass and improve the quality thereof.

Referring to the drawings and particularly to Fig. 6, the numerals 10 and 11 designate two sheets of glass having an intervening sheet of non-brittle material 12 interposed therebetween. Some sort of bonding medium is placed between the glass sheets and the non-brittle sheet and this bonding material is herein designated 13. After the several sheets of material to be joined have been properly assembled in superposed relation, the sandwich may be placed within a press designated in its entirety by the numeral 14 and illustrated in Fig. 3. Of course, any desired type of press may be used.

As brought out above, due to the liquid characteristics of the bonding medium, there is a tendency for the several laminations to move or slip relative to one another during the uniting thereof. The aim of the present invention is to prevent this relative movement between the sheets and to this end, the assembled sheets of material, when placed within the press 14, are adapted to be positioned within a frame such as shown in Fig. 1 and designated in its entirety by the numeral 15. The shape of the frame 15 is of course dependent upon the shape of the sheets to be united.

As herein illustrated, however, by way of example, the frame is of a substantially rectangular formation and comprises the side pieces or members 16 and 17 and the end pieces or members 18 and 19. The adjacent ends of the side and end members 16 and 18 respectively are adapted to overlap one another and to be rigidly secured together as indicated at 20. The overlapping portions of the members are, of course, reduced in thickness so that the combined thicknesses of the two overlapping portions will be substantially equal to the thickness of the remaining portion of each member. The adjacent ends of the side and end members 17 and 19 respectively are also adapted to overlap one another and to be secured together as at 21 while the side member 17 is adapted to be pivotally associated with the end member 18 as at 22. Thus, there is provided a substantially rectangular frame comprising a plurality of members so associated with one another that the frame may be swung open to facilitate the placing of the assembled sheets of material to be joined therein. That is, the members 17 and 19 may be swung about the pivot point 22 as indicated by the dotted lines in Fig. 1. When the frame is closed, the members are adapted to be maintained in such position by means of a pin or other fastening element 23 adapted to pass through aligned openings in the adjacent overlapping end portions of members 16 and 19.

When the frame is closed, there is provided a frame opening 24 within which the assembled sheets of material to be joined are adapted to be placed. As shown particularly in Fig. 1, the frame opening is preferably slightly larger than the assembled sheets to be joined so that the side and end members of the frame do not contact directly with the edges thereof but are spaced slightly therefrom. For maintaining the sheets within the frame opening against relative movement or slippage, a retaining member 25 is carried by the inside of each side and end member of the frame and which retaining members are arranged to engage the edges of the sheets as shown in Fig. 2. While these retaining members may be of any desired form, leaf springs are herein used for yieldably engaging the edges of the sheets.

In the use of the present invention, the assembled sheets of material, when placed within the press, are adapted to be positioned within the frame 15 and the retaining members 25 engaging the edges of the sheets will serve to prevent relative movement therebetween. When uniting the assembled sheets of material within the press 14 by the application of heat and pressure thereto, it is desirable that soft metal plates 26 and 27 of aluminum or the like be placed at either side of the glass sheets and that a sheet of blotting paper or the like 28 be positioned between each metal plate and in contact with the adjacent sheet of glass. This preferred arrangement is shown in Fig. 2 and has been found to aid in the proper uniting of the laminations. Therefore, in the use of the frame 15 with this method, the said frame is adapted to be positioned between the two metal plates 26 and 27. The frame is of course, adapted to be sufficiently thin so as not to interfere with the pressing operation.

In Figs. 4 and 5, the frame is adjustable or, in other words, so constructed that the size of the frame opening 24 may be varied so as to provide for differently sized sets of sheets. More specifically, the side members 16 and 17 of the frame are reduced in thickness at one end and provided with a series of openings 29 and 30 respectively which are in transverse alignment with one another. The end members 18 and 19 are likewise reduced in thickness at one end and provided with similar openings 31 and 32 respectively. The side member 17 is provided at its opposite ends with pins 33 (Fig. 5) which are adapted for selective engagement with the openings 31 and 32 while the end member 19 is also provided at its opposite ends with similar pins adapted for selective engagement with the openings 29 and 30. Thus, with this construction, when it is desired to decrease the width of the frame opening 24 without decreasing its length, the side member 17 is moved inwardly and the pins 33 thereof inserted within the desired openings 31 and 32 dependent upon the width of frame opening desired. On the other hand, if it is desired to decrease the length of the frame opening without decreasing its width, the end member 19 is moved inwardly and the pins 33 carried thereby inserted within the desired openings 29 and 30. Further, if it is desired to decrease both the length and width of the frame opening to accommodate a still smaller size set of sheets, both the side members 17 and end member 19 are moved inwardly as indicated by the dotted lines in Fig. 4, one of the pins 33 being inserted through the aligned openings 30 and 32 where the two members overlap as indicated at 34. Thus, the frame members 17 and 19 are adjustable with respect to the members 16 and 18 to vary the opening 24 in the frame so as to provide for differently sized sets of sheets.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. Means for holding a plurality of superposed sheets of material to be joined against relative movement with respect to one another during such joining, including a frame for receiving the assembled sheets therein, and means carried by the frame and adapted to engage the edges of said sheets.

2. Means for holding a plurality of superposed sheets of material to be joined against relative movement with respect to one another during such joining, including a frame for receiving the assembled sheets therein, and spring means carried by the frame and adapted to engage the edges of said sheets.

3. Means for holding a plurality of superposed sheets of material to be joined against relative movement with respect to one another during such joining, including a frame for receiving the assembled sheets therein, said frame comprising a plurality of members spaced from the sheets, and a plurality of retaining members carried by the frame members and adapted to engage the edges of said sheets.

4. Means for holding a plurality of superposed sheets of material to be joined against relative movement with respect to one another during such joining, including a frame for receiving the assembled sheets therein, said frame comprising side and end members spaced from the sheets, and a plurality of spring members carried by the frame members and adapted to yieldably engage the edges of said sheets.

5. Means for holding a plurality of superposed sheets of material to be joined against relative movement with respect to one another during such joining, including a frame for receiving the assembled sheets therein, said frame comprising a plurality of members pivotally associated with one another whereby the frame may be swung open to facilitate the positioning of the sheets therein, and means carried by the frame and adapted to engage the edges of the sheets.

6. Means for holding a plurality of superposed sheets of material to be joined against relative movement with respect to one another during such joining, including a frame for receiving the assembled sheets therein, said frame comprising side and end members arranged in substantially rectangular formation, said members being pivotally associated whereby the frame may be swung open to facilitate the positioning of the sheets therein, and spring means carried by the frame members and adapted to yieldably engage the edges of said sheets.

Signed at Toledo, in the county of Lucas and State of Ohio, this 3d day of December, 1928.

GEORGE B. WATKINS.